(12) United States Patent
Jang

(10) Patent No.: US 11,454,336 B1
(45) Date of Patent: Sep. 27, 2022

(54) SUPPORT DEVICE OF VACUUM PIPE

(71) Applicant: UB ENG CO., LTD., Gyeonggi-do (KR)

(72) Inventor: Se Hwan Jang, Gyeonggi-do (KR)

(73) Assignee: UB ENG CO., LTD., Gyeonggi-do (KR)

( * ) Notice: Subject to any disclaimer, the term of this patent is extended or adjusted under 35 U.S.C. 154(b) by 0 days.

(21) Appl. No.: 17/565,923

(22) Filed: Dec. 30, 2021

(51) Int. Cl.
*F16L 5/10* (2006.01)
*F16F 15/02* (2006.01)

(52) U.S. Cl.
CPC ............ *F16L 5/10* (2013.01); *F16F 15/02* (2013.01)

(58) Field of Classification Search
CPC ............ F16L 5/10; F16F 15/02; E04B 1/98
See application file for complete search history.

(56) References Cited

U.S. PATENT DOCUMENTS

2003/0052459 A1 * 3/2003 Shorey ............... F16L 5/10
277/603

FOREIGN PATENT DOCUMENTS

| CN | 211624441 U | * | 10/2020 | |
| CN | 113007452 A | * | 6/2021 | |
| CN | 215519337 U | * | 1/2022 | |
| DE | 102010026827 A1 | * | 1/2012 | ............... F16L 5/02 |
| EP | 1236943 A1 | * | 9/2002 | ......... B60R 16/0222 |
| EP | 1837573 A1 | * | 9/2007 | ............... F16L 5/10 |
| KR | 20210047792 A | * | 4/2021 | |

* cited by examiner

Primary Examiner — Babajide A Demuren
(74) Attorney, Agent, or Firm — IP Legal Services, LLC

(57) ABSTRACT

According to an embodiment of the present invention, since the vibration transmitted from the vacuum pipe can be reduced according to the movement of the mass, even anti-vibration effect can be expected regardless of the size of the pipe, the characteristics of the fluid or the like and the vibration prevention effect can be improved by further increasing the vibration transmission area by the elasticity of the press member.

7 Claims, 6 Drawing Sheets

SUPPORT DEVICE OF VACUUM PIPE

BACKGROUND OF THE INVENTION

Technical Field

The present invention relates to a support device of a vacuum pipe used in the working environment of a semiconductor device, a display device or the like and, more particularly, to a support device of a vacuum pipe, which reduces the vibration of a vacuum pipe so as to prevent damage to the device due to a fatigue load and reduces noise or the like.

Background Art

In general, semiconductor devices, display devices or the like are manufactured maintaining a working environment according to a reactant gas condition, for example, a vacuum condition, and a vacuum pump and a vacuum pipe through which the reactant gas flows are used to satisfy and maintain the reactant gas condition.

It is common to form such a working environment in a multilayered structure. Therefore, in general, a vacuum pump is installed on a lower floor and a support device is coupled to each layer by means of a bolt or the like so as to allow a vacuum pipe to pass through the support device and then be fixed therein so that the vacuum pipe connected to the vacuum pump is supported on each layer constituting the multilayered structure. According to a prior art there is disclosed a vacuum pipe support device, in which holding force and stability are improved by fixing a sleeve body through which a vacuum pipe passes to a bottom surface.

However, since the reactant gas conditions of the working environment should be maintained continuously, not intermittently, vibration caused by continuous vacuum pump use cannot be ignored.

The continuous vibration generates fatigue loads and, due to the fatigue load, bolts used for coupling the vacuum pipe are loosened or the coupling positions are separated, causing deformation and damage to the support device and the vacuum pipe. In order to solve these problems, prior art suggests preventing damage to a cover plate by installing a fixed body and an elastically deformable body on the cover plate.

However, in the registered patent, the cover plate fixing body merely corresponds to a washer installed on the bolt, and thus it is difficult to actually expect a reduction in vibration of a vacuum pipe or a support device. In addition, the elastic deformable body is to apply prestress to a member so as to increase the coupling force of the member, and still has problems in deformation, damage or the like occurring at the coupling position due to vibration.

In addition, the vibration transmitted from the vacuum pipe is transmitted to each layer, causing vibration and noise in each layer. Furthermore, due to the structure of the support device through which the vacuum pipe penetrates, problems such as diffusion of pollutants or smoke and heat loss through the coupling part between the support device and each layer or through the inner space of the support device cannot be neglected.

SUMMARY

Technical Problems

The present invention has been derived to solve the problems of the prior art described above, and has an objective to provide a support device of a vacuum pipe, which can reduce the vibration acting on a vacuum pipe, thereby improving the stability and safety in the coupling and use of the vacuum pipe, and reduce the vibration of the vacuum pipe support device as well as the vacuum pipe itself.

The present invention has another objective to provide a support device of a vacuum pipe, which can reduce pollutants, smoke, and heat loss by utilizing the space inside the support device of the vacuum pipe.

Technical Solutions

According to an embodiment of the present invention in order to achieve the objectives described above and solve the technical problems, there is provided a support device of a vacuum pipe used in the working environment of a semiconductor or display device having a multilayered structure, comprising a housing, through which the vacuum pipe passes and which is coupled to at least one layer of a plurality of layers of the multilayered structure so as to support the vacuum pipe and has an accommodation space formed therein, and a vibration prevention member provided in the accommodation space of the housing so as to reduce vibration of the vacuum pipe, wherein the vibration prevention member comes into contact with the vacuum pipe so as to reduce the vibration of the vacuum pipe.

In addition, in the support device of a vacuum pipe according to an embodiment of the present invention, the vibration prevention member may include a support member disposed in the accommodation space and a buffer member, which is coupled to the support member and has a mass accommodated in a sealed inner space thereof so as to dampen the vibration transmitted from the vacuum pipe, wherein the mass may move by inertia in the opposite direction to the moving direction of the vacuum pipe so as to cushion the vibration of the vacuum pipe.

Furthermore, according to an embodiment of the present invention, the support device of a vacuum pipe may further include a press member provided adjacent to the vibration prevention member in the accommodation space of the housing and pressurizing the vibration prevention member.

In the support device of a vacuum pipe according to an embodiment of the present invention, the press member may include a first elastic press member for pressing the vibration prevention member in the direction of the vacuum pipe, and the buffer member may include a first buffer part, which is arranged to be biased in the direction of the vacuum pipe on the basis of the center of the support member, and has a vertical cross-sectional area, which is larger in one side in the direction in which the vacuum pipe is provided than in the other side in the direction in which the first elastic press member is provided.

In addition, in the support device of a vacuum pipe according to an embodiment of the present invention, the buffer member may further include a second buffer part arranged to be biased in the upper or lower direction of the support member.

Meanwhile, in the support device of a vacuum pipe according to an embodiment of the present invention, a plurality of vibration prevention members may be provided so as to be spaced apart from each other, and the press member may include a second pressurized elastic body provided between the plurality of vibration prevention members so as to press the plurality of vibration prevention members in directions away from each other.

In addition, in the support device of a vacuum pipe according to an embodiment of the present invention, the buffer member may further include a second buffer part arranged to be biased in the upper or lower direction of the support member, and the plurality of vibration prevention members may be arranged up and down, wherein the second buffer part of the vibration prevention member disposed in the upper part is arranged to be biased toward the upper side, and the second buffer part of the vibration prevention member disposed in the lower part is arranged to be biased toward the lower side.

Meanwhile, in the support device of a vacuum pipe according to an embodiment of the present invention, the mass is a mixture of two or more substances with specific gravities different from each other.

Advantageous Effects

According to the one aspect of the present invention, the vibration acting on the support device of a vacuum pipe may be reduced improving the stability and safety in the coupling and use of the vacuum pipe.

In addition, the vibration of the vacuum pipe itself may be reduced so that it is possible to reduce the vibration or noise transmitted to the entire multilayered structure.

Furthermore, even if the type or operating state of reactive gas is changed, reduction performance corresponding to the changed state may be exhibited without any particular manipulation, thereby reducing vibration and improving ease of use.

Moreover, the inner space of the support device may be used so as to save space, prevent the spread of pollutants or smoke, and reduce heat loss.

DETAILED DESCRIPTION

While the present invention has been particularly shown and described with reference to the preferred embodiments thereof with reference to the accompanying drawings, it will be understood by those skilled in the art that various changes in form and details may be made therein without departing from the spirit and scope of the invention as defined by the appended claims. Therefore, the above-described embodiments are to be considered in all respects as illustrative and not restrictive, and the scope of the invention as set forth in the foregoing detailed description is indicated by the following claims, and all such modifications or variations that come within the meaning and range of the claims and their equivalents are intended to be embraced therein.

Hereinafter, embodiments of the present invention will be described in detail with reference to the accompanying drawings.

A support device of a vacuum pipe 10 according to the present invention is to support a vacuum pipe 10 used in the working environment of a semiconductor or display device of a multilayered structure, wherein the vacuum pipe 10 is coupled to a vacuum pump (not shown) installed in a lower layer or a middle layer of a plurality of layers of the multilayered structure, and a fluid flows according to the operation of the vacuum pump.

The support device of the vacuum pipe 10 may be coupled to any one or more layers of the multilayered structure so as to support the vacuum pipe 10, wherein the any one of the multilayered structure may include an uppermost layer, a lowermost layer, and a middle layer. Hereinafter, for clarity of the invention, the vacuum pipe is exemplified and described as being installed in the middle layer among the respective layers of the multilayered structure.

Figure 1:
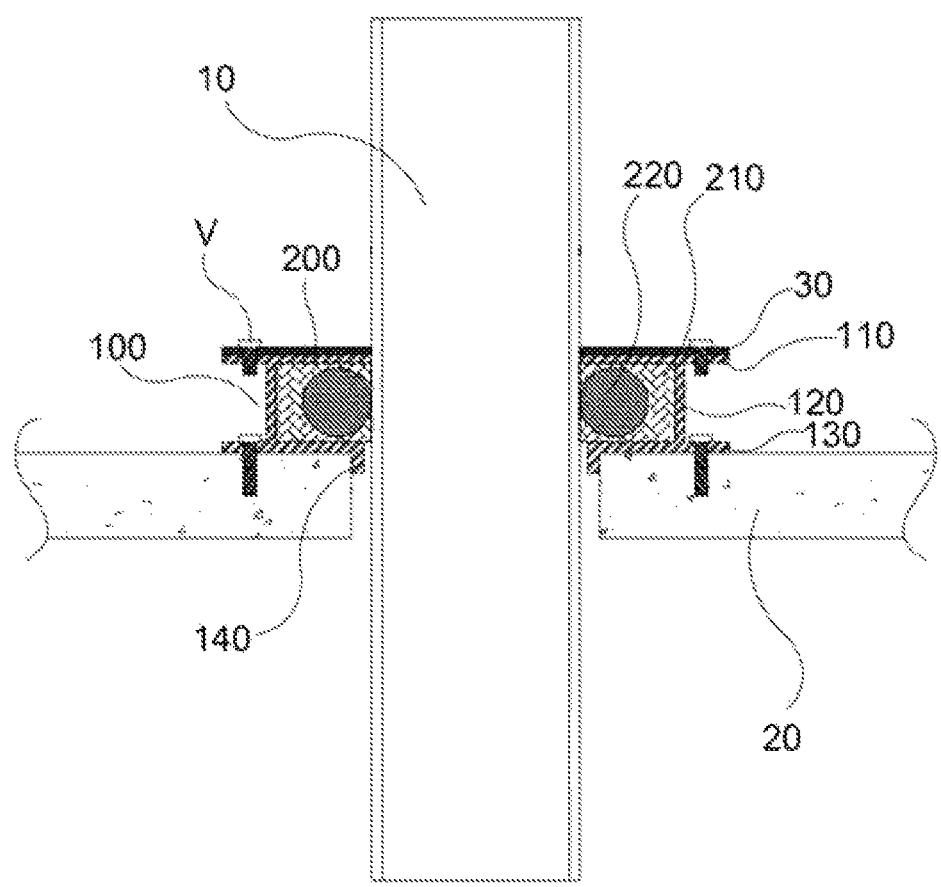
FIG. 1 is a cross-sectional view showing a support device of a vacuum pipe according to an embodiment of the present invention.
Figure 2A:
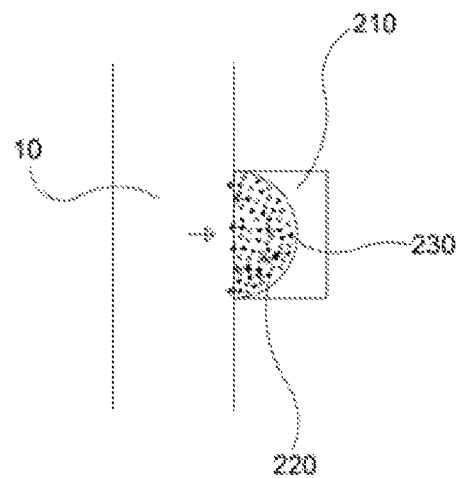
FIGS. 2A and 2B and FIGS. 3A and 3B are conceptual diagrams showing the principle of vibration reduction of a buffer member according to an embodiment of the present invention.
Figure 2B:
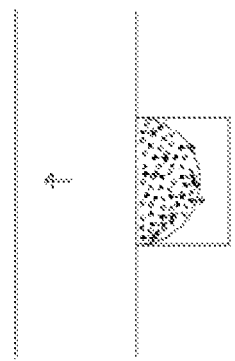
Figure 3A:
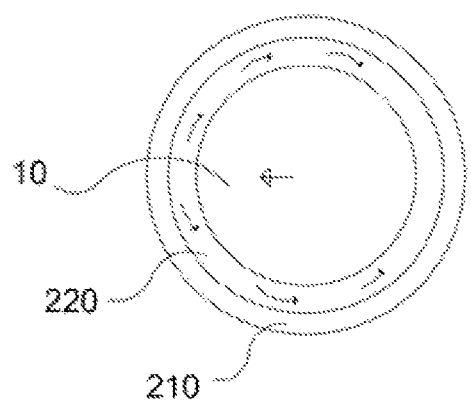
Figure 3B:
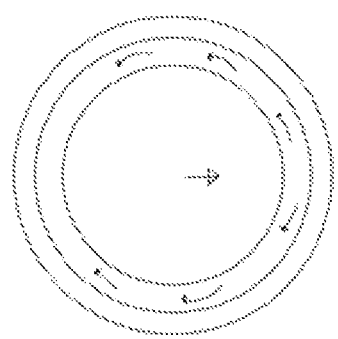

FIG. 1 is a cross-sectional view showing a support device of a vacuum pipe according to an embodiment of the present invention.

The support device of a vacuum pipe according to the present invention includes a housing 100, through which the vacuum pipe 10 passes and which is coupled to one layer 20 so as to support the vacuum pipe 10 and has an accommodation space 120 formed therein. The housing 100 includes an upper frame 110, a lower frame 130, and a main body 120 that connects the upper frame 110 and the lower frame 130, thereby forming an outer frame.

It is preferable that the main body 120 has a shape such as a cylinder, a cuboid, or a cube in consideration of the stable support of the vacuum pipe 10 as well as the ease of installation thereof.

The housing 100 may be provided with an upper frame 110 on the upper surface thereof and the upper frame 110 is coupled to a pipe support frame 30 that is coupled to the outside of the vacuum pipe 10, wherein the pipe support frame 30 and the upper frame 110 may be formed with through holes so that a bolt V may be coupled thereto.

Even though the bolt V is exemplified as a coupling means of the pipe support frame 30 and the upper frame 110 herein, various coupling means or methods such as mechanical coupling of grooves and protrusions or the like, physical coupling using magnetism, frictional force, adhesion force, or the like, or chemical bonding may be employed.

A lower frame 130 may be provided on the lower surface of the housing 100 so as to be coupled to each layer 20, wherein it is preferable that, for the stability of load bearing and ease of installation, the lower frame 130 of the housing 100 is formed with a folded part 140 by folding the inner end of the lower frame 130 of the housing 100 downwards so as to be in contact with the inner surface of a vacuum pipe 10 through hole formed in each layer 20.

The lower frame 130 may be formed with a through hole in the outside thereof so as to be coupled to each layer 20 by means of a bolt V or the like, wherein various means and methods may be employed for the coupling means as in the upper frame 110.

A vibration prevention member 200 is provided in the inner accommodation space 120 of the housing 100 so as to reduce the vibration of the vacuum pipe 10. The vibration prevention member 200 cushions the vibration of the vacuum pipe 10, wherein in order to smoothly transmit vibration, at least a portion of the vibration prevention member 200 is in close contact with the vacuum pipe 10.

According to an embodiment of the present invention, the vibration prevention member 200 may include a support member 210 arranged in the accommodation space and a buffer member 220, which is coupled to the support member 210 and has a mass 230 accommodated in a sealed inner space thereof, thereby cushioning the vibration of the vacuum pipe 10.

The support member 210 supports the buffer member 220 and may be formed of various materials, such as metal and synthetic resin, wherein it is preferable that the support member 210 is made of a material that can be deformed by vibration or external force, such as rubber or synthetic resin, so that the vibration transmitted through the vacuum pipe 10 or the buffer member 220 is prevented from being directly transmitted to the housing 100.

In addition, the support member 210 may be provided with a rubber material, a gasket, an O-ring, etc. on a surface facing the inner wall 311 of the accommodation space 120 of the housing 100 so as to prevent vibration from being transmitted directly to the housing 100. In this case, it is preferable that the support member 210 and the inner wall 311 of the accommodation space 120 be spaced apart from each other at a certain distance and have a structure where the support member 210 and the inner wall 311 of the accommodation space 120 come into contact with each other through the rubber or the gasket.

The buffer member 220 according to the present invention has a structure, in which the mass 230 is accommodated in the sealed inner space thereof, and is supported by being coupled to the support member 210.

The buffer member 220 is preferably coupled so that a portion of the outside of the buffer member 220 is wrapped by the support member 210 for stability of coupling with the support member 210.

The buffer member 220 may have a ring shape as a whole in consideration of the flow resistance of the mass 230 accommodated therein. The buffer member 220 having such a ring shape is advantageous in terms of vibration reduction because the flow resistance of the mass 230 is reduced through a curved surface compared to the case of a rectangular frame or a polygonal frame shape.

FIGS. 2A and 2B and FIGS. 3A and 3B are conceptual diagrams showing the principle of vibration reduction of the buffer member 220 according to an embodiment of the present invention.

The vibration prevention effect of the buffer member 220 according to the present invention will be described with reference to FIGS. 2A and 2B and FIGS. 3A and 3B. Referring to FIGS. 2A and 2B and FIGS. 3A and 3B, the mass 230 accommodated in the buffer member 220 moves by inertia in the opposite direction to the moving direction of the vacuum pipe 10 so that the vibration of the vacuum pipe 10 is canceled according to the momentum of the mass 230 in a direction opposite to the movement of the vacuum pipe 10. The present invention as described above does not actively suppress vibration by providing a separate excitation means or vibration means, but passively reduces vibration according to the vibration of vacuum pipe 10. Therefore, there is an advantage that it is possible to carry out constant and continuous vibration reduction regardless of the material or size of the vacuum pipe 10, the type of an internal fluid, the degree of operation of the vacuum pump, or the like.

It is possible to apply various materials such as metal, synthetic resin, rubber, etc., to the buffer member 220, and the mass 230 accommodated therein can also be formed of various materials such as solid, liquid, gas, or the like. However, it is preferable to determine the material of the buffer member 220 and the material of the mass 230 in consideration of damage to the buffer member 220, corrosion and vibration transmission of the buffer member 220, the impact of the mass 230 or the like. For example, when the strength of the buffer member 220 is high, a solid or the like having a relatively large mass may be used as the mass 230. In addition, when the strength of the buffer member 220 is low, a liquid or the like having a relatively small mass may be used as the mass 230.

In an embodiment of the present invention, the mass 230 may be composed of two or more materials having specific gravities different from each other. This is to ensure the mobility of the mass 230 and the durability of the buffer member 220. When the inside of the buffer member 220 is completely filled with the mass 230 formed of a single material, the movement of the mass 230 is not smooth. Even if the inside of the buffer member 220 is filled with the mass 230 at a certain rate and the rest is filled with air, there is a problem that damage to the buffer member 220 or noise may occur depending on the impact caused by the movement of the mass 230.

On the other hand, when using two or more different substances for the mass 230, for example, a solid having a relatively large mass and a liquid having a relatively small mass are mixed and used, the solid with a large mass can move smoothly and at the same time the liquid can buffer the shock caused by the movement of the solid. Therefore, smooth vibration prevention effect can be expected along with the durability of the buffer member 220. The same effect can also be expected even when using liquids having specific gravities different from each other.

Figure 4:
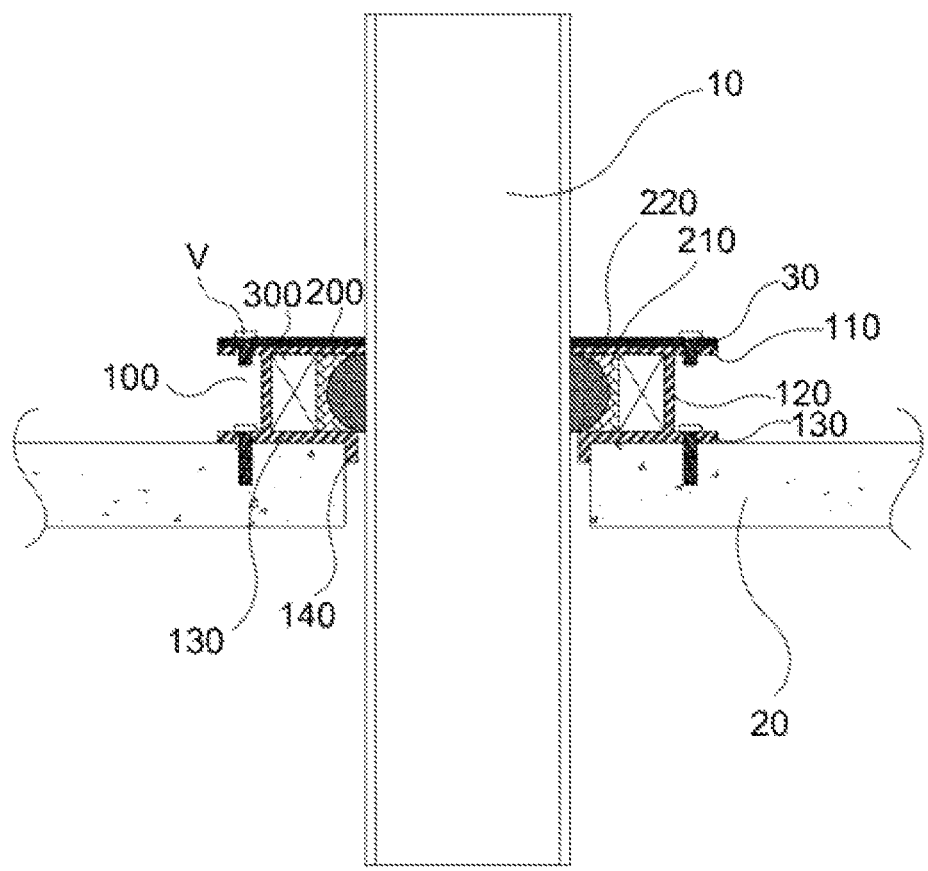
FIG. 4 is a cross-sectional view showing a support device of a vacuum pipe including a press member according to an embodiment of the present invention.
Figure 5:
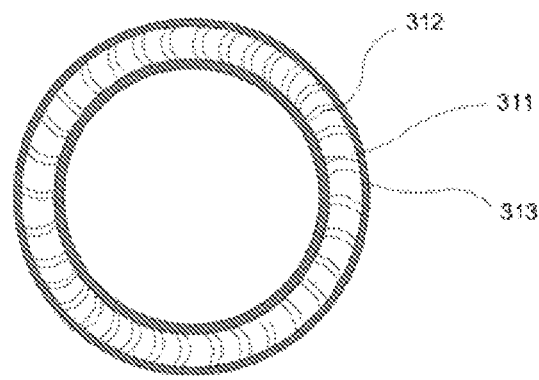
FIG. 5 is a cross-sectional view showing a press member according to an embodiment of the present invention.

FIG. 4 is a cross-sectional view showing a support device of a vacuum pipe including a press member 300 according to an embodiment of the present invention, and FIG. 5 is a cross-sectional view showing a press member 300 according to an embodiment of the present invention.

Referring to FIG. 4, in an embodiment of the present invention, a support device of a vacuum pipe may further include a press member 300, which is provided adjacent to the vibration prevention member 200 in the accommodation space 120 of the housing 100 and presses the vibration prevention member 200.

The press member 300 pressurizes the vibration prevention member 200, particularly, the buffer member 220 to the vacuum pipe 10 or the upper or lower portion of the housing 100 in the accommodation space 120 so as to facilitate the transmission of vibration.

Although not illustrated in the present invention, the vibration prevention member 200 may be formed with grooves or protrusions and the press member 300 may be formed with protrusions or grooves on the surface of the press member 300, which comes into contact with the vibration prevention member 200. This structure facilitates the coupling of the vibration prevention member 200 and the press member 300 and at the same time prevents the separation of the vibration prevention member 200 and the press member 300 which may occur due to continuous vibration.

Referring to FIG. 5, the press member 300 may include a first elastic press member 310 for pressing the vibration prevention member 200 in the direction of the vacuum pipe 10. The first elastic press member 310 is disposed around the outside of the vibration prevention member 200 so as to press the vibration prevention member 200 in the direction of the pipe by elasticity. By the pressure of the first elastic press member 310, the buffer member 220 further comes into close contact with the vacuum pipe in the direction of the vacuum pipe 10 and a contact area is increased by the close contact with the vacuum pipe 10 so that there is an effect of more effectively reducing the vibration of the vacuum pipe 10.

As shown in FIG. 5, the first elastic press member 310 has a ring shape, including an inner wall 311, an outer wall 313 provided outside the inner wall 311, and a leaf spring 312 provided between the inner wall 311 and the outer wall 313, wherein the first elastic press member 310 has a structure, in which the inner wall 311 presses the outside of the vibration prevention member 200 in the vacuum pipe 10 direction through the elasticity of the leaf spring 312 while the outer wall 313 is supported on the inside of the housing 100. In this case, the inner wall 311 may be formed of a deformable material such as rubber, synthetic resin or the like so as to facilitate pressurization through the leaf spring 312. In addition, the inner wall 311 may include a plurality of divided inner walls 311 so that each of the divided inner walls 311 is coupled to one outer wall 313 by means of a leaf spring 322, 312 or the like, thereby minimizing the interference between the adjacent inner walls 311 due to pressurization.

Even though the embodiment of the present invention is shown with the structure, in which the leaf spring 312 is installed between the inner wall 311 and the outer wall 313 of the first elastic press member 310, it is also possible to provide a structure, in which the inner wall 311 or the outer wall 313 is omitted so that the inside of the housing 100 and the leaf spring 312 are in direct contact or the outside of the vibration prevention member 200 and the leaf spring 312 are in direct contact. In addition, if the vibration prevention member 200 can be pressed by elasticity, that is, restoring force, various members such as a coil spring can be used instead of the leaf spring 312.

Referring back to FIG. 4, the buffer member 220 of the vibration prevention member 200 may include a first buffer part 221, which is arranged to be biased in the direction of the vacuum pipe 10 on the basis of the center of the support member 210 and has a vertical cross-sectional area which is larger in one side in the direction in which the vacuum pipe is provided than in the other side in the direction in which the first elastic press member is provided.

The first buffer part 221 has a vertical cross-sectional area that gradually increases in the direction of the vacuum pipe 10 and becomes maximum at a position where the first buffer part 221 is in contact with vacuum pipe 10, wherein the cross section of the first buffer part 221 has the shape of a semicircle or an arc. As the cross section of the first buffer part 221 has the shape of a semicircle or an arc, it is possible to reduce the flow resistance of the internal mass 230 compared to the case where the cross section has a triangular, square, or polygonal shape. In addition, since the contact area with the vacuum pipe 10 can be increased compared to the case where the cross section of the first buffer part 221 has a circular shape, there is a more advantageous effect in terms of vibration reduction.

It is also possible to provide a plurality of first buffer parts 221, wherein the plurality of first buffer parts 221 may be vertically arranged in a ring shape so as to be in contact with the vacuum pipe 10, respectively.

In this case, the mass 230 accommodated in each of the plurality of first buffer parts 221 can be formed using different materials depending on the arrangement of each of the first buffer parts 221, the vibration characteristics of the vacuum pipe 10 per position, the coupling state with respect to the housing 100, or the like, thereby being optimized in terms of vibration reduction.

Figure 6:
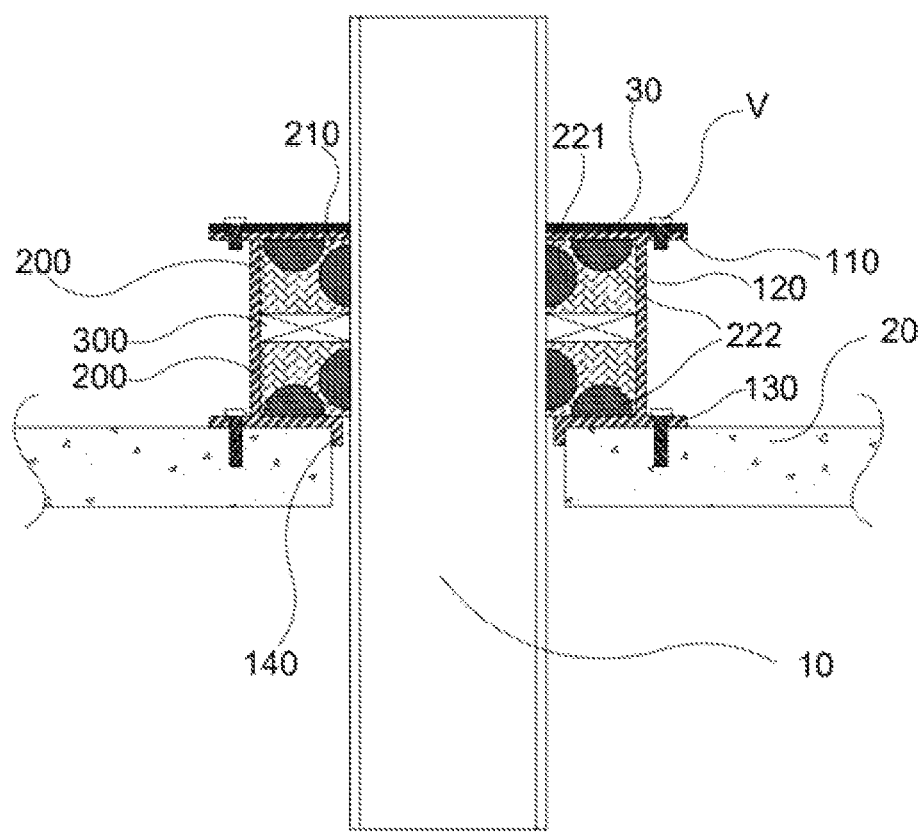
FIG. 6 is a cross-sectional view showing a support device of a vacuum pipe, including a press member, according to another embodiment of the present invention.
Figure 7:
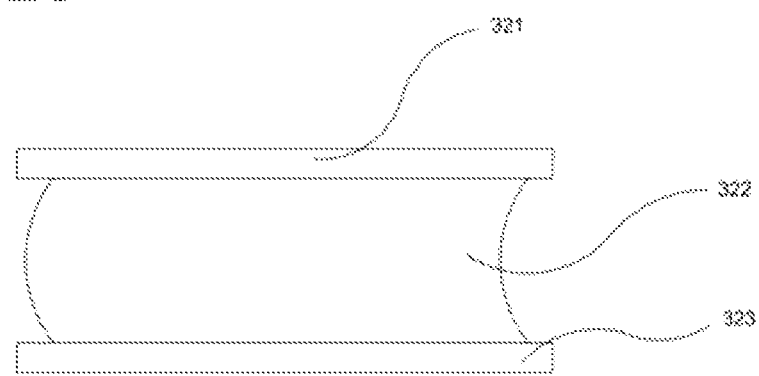
FIG. 7 is a cross-sectional view showing a press member according to still another embodiment of the present invention.
Figure 8:
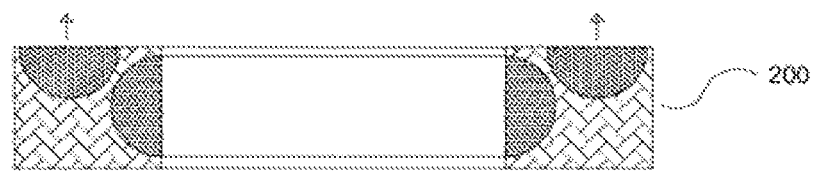
FIG. 8 is a conceptual diagram showing a vibration prevention member and a press member according to the present invention.
Figure 8:
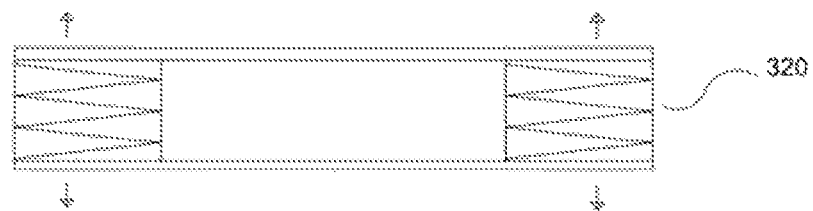
Figure 8:
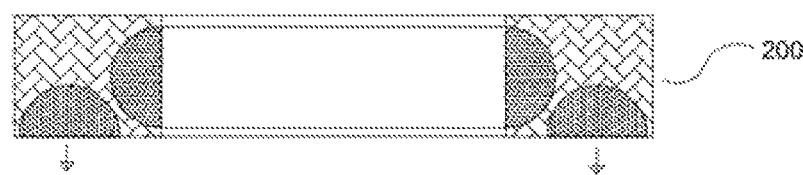

FIG. 6 is a cross-sectional view showing a support device of a vacuum pipe 10, including a press member 300, according to another embodiment of the present invention, FIG. 7 is a cross-sectional view showing a press member 300 according to still another embodiment of the present invention, and FIG. 8 is a conceptual diagram showing a vibration prevention member and a press member according to the present invention.

Referring to FIG. 6, a buffer member 220 according to an embodiment of the present invention may further include a second buffer part 222 arranged to be biased in the upper or lower direction of the support member 210.

The second buffer part 222 is in contact with the upper frame 110 or the lower frame 130 of the housing 100 so as to reduce the vibration of the upper frame 110 or the lower frame 130 transmitted from the vacuum pipe 10.

When the second buffer part 222 is disposed in the upper portion of the vibration prevention member 200, the second buffer part 222 is arranged to be biased in the upper frame 110 direction of the housing 100 on the basis of the center of the support member 210, wherein the horizontal cross-sectional area of the second buffer part 222 may be larger in the upper direction of the support member 210 than in the center direction thereof. In addition, when the second buffer part 222 is disposed in the lower portion of the vibration prevention member 200, the second buffer part 222 is arranged to be biased in the lower frame 130 direction of the housing 100 on the basis of the center of the support member 210, wherein the horizontal cross-sectional area of the second buffer part 222 may be larger in the lower direction of the support member 210 than in the center direction thereof. As described above with respect to the first buffer part 221, the cross section of the second buffer part 222 has the shape of a semicircle or an arc so that it is possible to increase a contact area with the upper frame 110 or the lower frame 130 of the housing 100 and at the same time to reduce the flow resistance of the internal mass 230.

In addition, the second buffer part 222 can be applied together with the first buffer part 221 described above. Like the first buffer parts 221, a plurality of second buffer parts 222 may be arranged in the horizontal direction of the vibration prevention member 200, and different masses 230 may be accommodated in the plurality of second buffer parts 222, thereby optimizing vibration prevention according to vibration characteristics.

In an embodiment of the present invention, the press member 300 may include a second elastic press member 320 for pressing the vibration prevention member 200 upward or downward. Referring to FIG. 7, the second elastic press member 320 has a ring shape, including an upper wall 321, a lower wall 323, and a leaf spring 322 provided between the upper wall 321 and the lower wall 323, wherein the second elastic press member 320 has a structure for pressing the vibration prevention member 200 upward or downward in a state, in which the upper wall 321 is supported on the upper frame 110 of the housing 100 or the lower wall 323 is supported on the lower frame thereof. The leaf spring 322 can be applied with various structures or materials that can press the vibration prevention member 200 by elasticity or restoring force as described above with respect to the first elastic press member 310.

Referring back to FIG. 6, in an embodiment of the present invention, a plurality of vibration prevention members 200 may be provided to be spaced apart from each other. In this case, the plurality of vibration prevention members 200 are arranged up and down, wherein the vibration prevention member 200 disposed at the upper part is provided with a second buffer part 222 in contact with the upper frame 110 of the housing 100, and the vibration prevention member 200 disposed at the lower part is provided with a second buffer part 222 in contact with the lower frame 130 of the housing 100. In addition, of course, a first buffer part 221 in contact with the vacuum pipe 10 may be provided to each of the vibration prevention members 200 disposed at the upper part and the lower part.

Accordingly, the first and second buffer parts can reduce the vibration of the vacuum pipe 10, the upper plate in direct contact with the vacuum pipe 10, and the lower plate in contact with each layer 20, respectively. In addition, since the first buffer part 221, the second buffer part 222 provided in the upper part, and the mass 230 of the second buffer part 222 provided in the lower part can be determined according to the vibration characteristics of the vacuum pipe 10, the upper frame 110, and the lower frame 130 which are the respective contact objects, more improved effects can be expected on the durability and noise reduction of the support device in addition to the vibration reduction effect.

Referring to FIG. 8, in an embodiment of the present invention, a press member 300 may be provided between the plurality of vibration prevention members 200 arranged up and down, and in this case, the press member 300 presses the plurality of vibration prevention members 200 away from each other by means of the second elastic press member 320, for example, upward and downward, respectively. The middle dotted line is a line indicating the center of the pipe.

The second elastic press member 320 can bring the vibration prevention members 200, in particular, the second buffer parts 222 into close contact in the upward and downward directions by elasticity and at the same time fix the vibration prevention members 200 inside the accommodation space 120 of the housing 100. Accordingly, a further improved vibration prevention effect can be expected along with the fixation of the buffer members.

Although not illustrated herein, it is preferable that protrusions or grooves that are respectively coupled to each other are formed on the lower surface of the vibration prevention member 200 and the upper surface of the second elastic press member 320, which are provided in the upper part, as well as the vibration prevention member 200 and the lower surface of the second elastic press member 320, which are provided in the lower part.

In addition, in an embodiment of the present invention, both the first elastic press member 310 and the second elastic press member 320 may be applied together, and it is also possible that the first elastic press members 310 press the vibration prevention member 200 in the direction of the vacuum pipe 10 and the second elastic press members 320 press the vibration prevention member 200 upward and downward, respectively.

As described hereinabove, since the support device of the vacuum pipe 10 according to the embodiments of the present invention can reduce the vibration transmitted from the vacuum pipe 10 through the passive movement of the mass 230, even vibration prevention effect can be expected regardless of the size of the pipe or the characteristics of a fluid. In addition, the vibration prevention effect can be improved by increasing the contact areas between the buffer member 220 and the vacuum pipe 10, between the buffer member 220 and the upper frame 110, or between the buffer member 220 and the lower frame 130 by the elasticity of the press member 300.

In addition, as the empty inner space of the support device can be used as the accommodation space 120 of the vibration prevention member 200 or the press member 300, there are further effects of preventing the diffusion of pollutants or smoke and reducing heat loss through the inner space in addition to the space saving effect.

BRIEF EXPLANATION OF REFERENCE SYMBOLS

10: vacuum pipe
20: each layer of working environment
30: pipe support frame
100: housing
110: upper frame
120: main body
121: accommodation space
130: lower frame
140: folded part
200: vibration prevention member
210: support member
220: buffer member
221: first buffer part
222: second buffer part
230: mass
300: press member
310: first elastic press member
311: inner wall
312, 322: leaf spring
313: outer wall
320: second elastic press member
321: upper wall
323: lower wall
V: bolt

What is claimed is:

1. A support device of a vacuum pipe used in the working environment of a semiconductor or display device having a multilayered structure, comprising:
  a housing, through which the vacuum pipe passes and which is coupled to at least one layer of a plurality of layers of the multilayered structure so as to support the vacuum pipe and has an accommodation space formed therein; and
  a vibration prevention member provided in the accommodation space of the housing so as to reduce vibration of the vacuum pipe, wherein the vibration prevention member comes into contact with the vacuum pipe so as to reduce the vibration of the vacuum pipe,
  the vibration prevention member includes:
  a support member disposed in the accommodation space; and
  a buffer member, which is coupled to the support member and has a mass accommodated in a sealed inner space thereof so as to dampen the vibration transmitted from the vacuum pipe,
  wherein the mass moves by inertia in the opposite direction to the moving direction of the vacuum pipe so as to cushion the vibration of the vacuum pipe.

2. The support device of a vacuum pipe used in the working environment of a semiconductor or display device having a multilayered structure according to claim 1, further comprising a press member provided adjacent to the vibration prevention member in the accommodation space of the housing and pressurizing the vibration prevention member.

3. The support device of a vacuum pipe used in the working environment of a semiconductor or display device having a multilayered structure according to claim 2, wherein
 the press member includes a first elastic press member for pressing the vibration prevention member in the direction of the vacuum pipe, and
 the buffer member includes a first buffer part, which is arranged to be biased in the direction of the vacuum pipe on the basis of the center of the support member so as to come into contact with the vacuum pipe, and has a vertical cross-sectional area, which is larger in one side in the direction in which the vacuum pipe is provided than in the other side in the direction in which the first elastic press member is provided.

4. The support device of a vacuum pipe used in the working environment of a semiconductor or display device having a multilayered structure according to claim 3, wherein the buffer member further includes a second buffer part arranged to be biased in the upper or lower direction of the support member.

5. The support device of a vacuum pipe used in the working environment of a semiconductor or display device having a multilayered structure according to claim 2, wherein
 a plurality of vibration prevention members are provided so as to be spaced apart from each other, and
 the press member includes a second pressurized elastic body provided between the plurality of vibration prevention members so as to press the plurality of vibration prevention members in directions away from each other.

6. The support device of a vacuum pipe used in the working environment of a semiconductor or display device having a multilayered structure according to claim 5, wherein
 the buffer member further includes a second buffer part arranged to be biased in the upper or lower direction of the support member,
 the plurality of vibration prevention members are arranged up and down,
 the second buffer part of the vibration prevention member disposed in the upper part is arranged to be biased toward the upper side, and
 the second buffer part of the vibration prevention member disposed in the lower part is arranged to be biased toward the lower side.

7. The support device of a vacuum pipe used in the working environment of a semiconductor or display device having a multilayered structure according to claim 2, wherein
 the mass is a mixture of two or more substances with specific gravities different from each other.

* * * * *